United States Patent
Hung

(10) Patent No.: US 11,705,801 B2
(45) Date of Patent: Jul. 18, 2023

(54) POWER SUPPLY WITH FEEDBACK ADJUSTMENT BASED ON INPUT VOLTAGE AND METHOD OF OPERATING THE SAME

(71) Applicant: ASIAN POWER DEVICES INC., Taoyuan (TW)

(72) Inventor: Tsung-Liang Hung, Taoyuan (TW)

(73) Assignee: ASIAN POWER DEVICES INC., Taoyuan (TW)

(*) Notice: Subject to any disclaimer, the term of this patent is extended or adjusted under 35 U.S.C. 154(b) by 78 days.

(21) Appl. No.: 17/476,741

(22) Filed: Sep. 16, 2021

(65) Prior Publication Data
US 2023/0009315 A1    Jan. 12, 2023

(30) Foreign Application Priority Data
Jul. 6, 2021   (TW) ................................ 110124801

(51) Int. Cl.
*H02M 3/335*   (2006.01)
*H02M 1/00*   (2006.01)

(52) U.S. Cl.
CPC ..... *H02M 1/0025* (2021.05); *H02M 3/33523* (2013.01)

(58) Field of Classification Search
CPC ........... H02M 1/0025; H02M 3/33523; H02M 3/33535
See application file for complete search history.

(56) References Cited

U.S. PATENT DOCUMENTS

| | | | |
|---|---|---|---|
| 2007/0018626 A1* | 1/2007 | Chi | H02M 3/157 323/282 |
| 2015/0062971 A1* | 3/2015 | Ye | H02M 3/33571 363/17 |
| 2017/0201184 A1* | 7/2017 | Yonezawa | H02M 1/32 |
| 2020/0186047 A1* | 6/2020 | Sen | H02M 3/33523 |

* cited by examiner

*Primary Examiner* — Alex Torres-Rivera
(74) *Attorney, Agent, or Firm* — Muncy, Geissler, Olds & Lowe, P.C.

(57) ABSTRACT

A power supply used to convert an input voltage into an output voltage, and the power supply includes an input detection circuit, a conversion circuit, a detection circuit, and a controller. The input detection circuit provides a power good signal or a power fail signal according to the input voltage. The conversion circuit converts the input voltage into an output voltage, and the detection circuit detects the output voltage according to the power good signal to accordingly provide an output feedback signal with a first feedback value. The controller stabilizes a voltage level of the output voltage according to the first feedback value. The detection circuit self-adjusts a feedback condition according to the power fail signal, and correspondingly adjusts the output feedback signal to a second feedback value according to the feedback condition. The controller reduces the voltage level of the output voltage according to the second feedback value.

10 Claims, 3 Drawing Sheets

POWER SUPPLY WITH FEEDBACK ADJUSTMENT BASED ON INPUT VOLTAGE AND METHOD OF OPERATING THE SAME

BACKGROUND

Technical Field

The present disclosure relates to a power supply and a method of operating the same, and more particularly to a power supply without an input voltage status pin and a method of operating the same.

Description of Related Art

The statements in this section merely provide background information related to the present disclosure and do not necessarily constitute prior art.

Due to the current popularity of system electronic products, in order to provide stable power supply for system electronic products, most of them will use or built-in power supply unit (PSU) to supply power to the system electronic products. The power supply usually converts an AC input voltage into a DC voltage (for example, but not limited to, 12 volts), for the rear-end converter or processor, etc. to convert the DC voltage into a specific voltage (for example, but not limited to, 5 volts, 3.3 volts, 1.8 volts, etc.) to operate. The system electronic products usually refer to electronic products that use motherboards (such as, but not limited to, computers, servers, communication equipment, and other electronic devices), and most of these products have multi-level power converters to perform voltage conversion.

The power supply used in the electronic products of the conventional system usually requires another specific pin with a signal wire to connect to the rear-end converter to achieve the power supply (input voltage status) notification of the power supply, and then notify whether the current status of the power supply such as the converter or processor in the rear-end is normal. Therefore, this situation will cause each circuit coupled at the rear end of the power supply to be connected by a circuit board trace. In the occasion of high-density wiring of the circuit board, adding several additional wiring will inevitably cause wiring difficulties, which will result in the problems that the product volume cannot be reduced and the power density cannot be increased.

SUMMARY

In order to solve the above-mentioned problems, the present disclosure provides a power supply without an input voltage status pin. The power supply converts an input voltage to supply power to a load. The power supply includes an input detection circuit, a conversion circuit, a detection circuit, and a controller. The input detection circuit provides a power good signal according to the input voltage which being good, and provides a power fail signal according to the input voltage which being faulty. The conversion circuit converts the input voltage into an output voltage to supply power to the load. The detection circuit is coupled to an output end of the conversion circuit and the input detection circuit, and detects the output voltage according to the power good signal to correspondingly provide an output feedback signal with a first feedback value. The controller is coupled to the detection circuit and the conversion circuit, and controls the conversion circuit to stabilize a voltage level of the output voltage to a first voltage level according to the first feedback value. The detection circuit self-adjusts a feedback condition according to the power fail signal to correspondingly adjust the output feedback signal to a second feedback value according to the feedback condition. The controller controls the conversion circuit to reduce the voltage level of the output voltage to a second voltage level according to the second feedback value.

In order to solve the above-mentioned problems, the present disclosure provides a method of operating a power supply without an input voltage status pin. The power supply converts an input voltage to supply power to a load. The method includes steps of: providing a power good signal according to the input voltage which being good, and providing a power fail signal according to the input voltage which being faulty, converting the input voltage into an output voltage to supply power to the load, detecting the output voltage according to the power good signal to correspondingly provide an output feedback signal with a first feedback value, stabilizing a voltage level of the output voltage to a first voltage level according to the first feedback value, adjusting a feedback condition according to the power fail signal, and correspondingly adjusting the output feedback signal to a second feedback value according to the feedback condition, and reducing the voltage level of the output voltage to a second voltage level according to the second feedback value.

The main purpose and effect of the present disclosure is to couple the detection circuit through the input detection circuit so as to change the feedback condition of the detection circuit by the power good signal or the power fail signal to change the voltage level of the output voltage. The change of the output voltage notifies the current operation status of the power supply and the advance notice of the impending power failure. Therefore, several circuit board wiring can be omitted, and the difficulty of circuit board wiring and the wiring density of the circuit board can be reduced, thereby reducing circuit cost and product volume and increasing power density.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
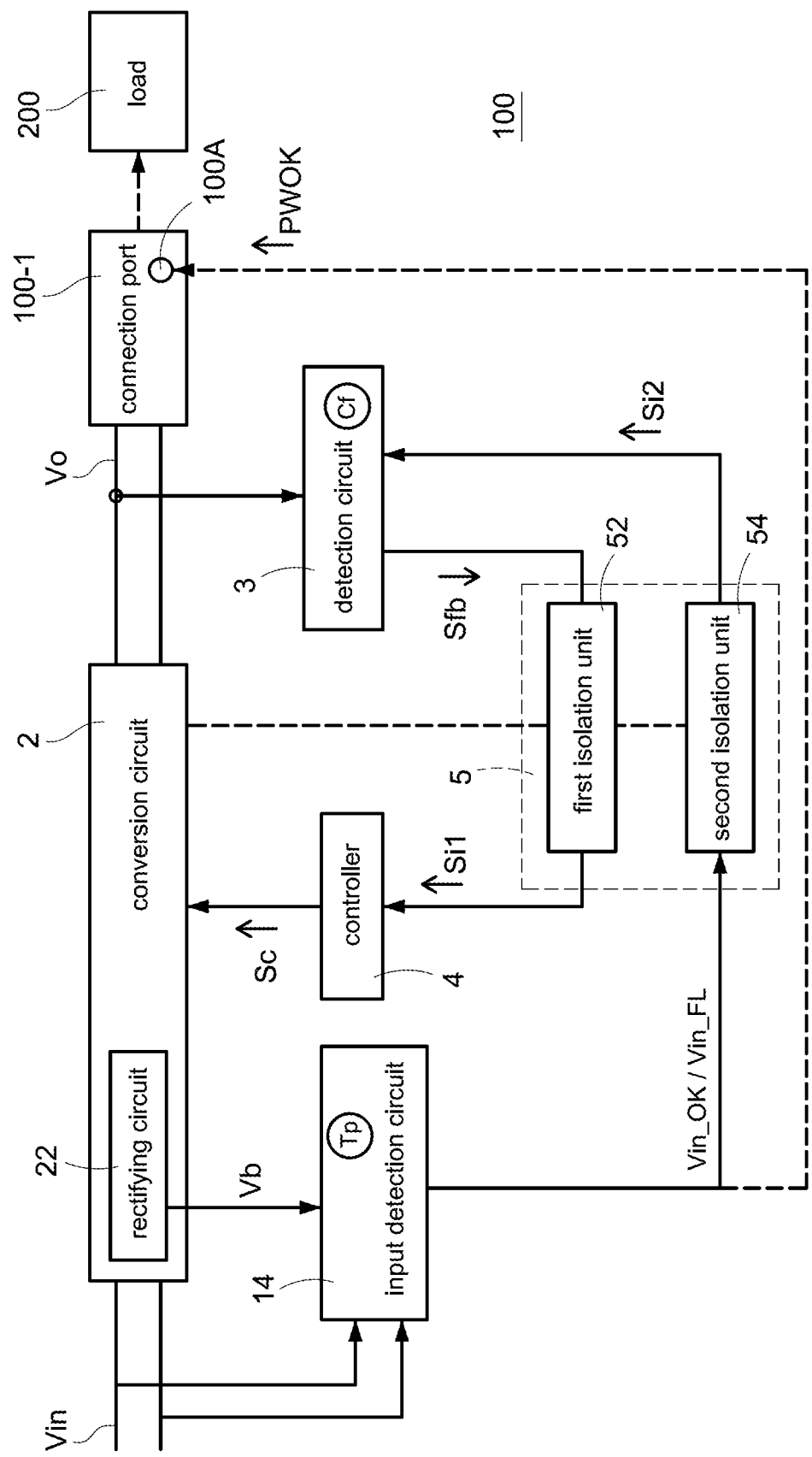
FIG. 1 is a block circuit diagram of a power supply without an input voltage status pin according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of a power supply without an input voltage status pin according to the present disclosure. The power supply 100 receives an (alternating current, AC) input voltage Vin and converts the input voltage Vin into an output voltage Vo for supplying power to a load 200. The power supply 100 includes a connection port 100-1, and the connection port 100-1 is used for cable plugging or circuit board routing to provide power or signals to the rear-stage circuit (i.e., the load 200). The power supply 100 includes an input detection circuit 14, a conversion circuit 2, a detection circuit 3, and a controller 4. The input detection circuit 14 is coupled to the conversion circuit 2, and the input detection circuit 14 is used to receive the input voltage Vin and correspondingly provide a power good signal Vin_OK or a power fail signal Vin_FL according to whether the input voltage Vin is normal or not.

Specifically, the input detection circuit 14 sets a predetermined threshold value Tp by, for example but not limited to, a resistance ratio of a voltage dividing circuit or a reference voltage of a comparator. When the input voltage Vin is greater than the predetermined threshold value Tp, it means that the input voltage Vin is stable and normal. At this condition, the input detection circuit 14 provides the power good signal Vin_OK representing that that the input voltage Vin is good. When the input voltage Vin is less than the predetermined threshold value Tp, it means that the input voltage Vin is unstable, or even the input voltage Vin is interrupted. At this condition, the input detection circuit 14 provides the power fail signal Vin_FL representing that the input voltage Vin is faulty (not good). Since the input detection circuit 14 may need to detect the AC input voltage Vin, the input detection circuit 14 may include a rectifying circuit that rectifies the AC input voltage into a DC input voltage.

The conversion circuit 2 is coupled to the input detection circuit 14 and the load 200. The conversion circuit 2 converts the input voltage Vin into the output voltage Vo to supply power to the load 200. The detection circuit 3 is coupled to an output end of the conversion circuit 2 and the input detection circuit 14, and correspondingly self-adjusts a feedback condition Cf according to the power good signal Vin_OK or the power fail signal Vin_FL. Specifically, the detection circuit 3 adjusts the feedback condition Cf to a first condition according to the power good signal Vin_OK, and adjusts the feedback condition Cf to a second condition according to the power fail signal Vin_FL. In particular, the feedback condition Cf may be adjusted to the first condition or the second condition by, for example but not limited to, a resistance ratio of a voltage dividing circuit or a reference voltage of a comparator. In one embodiment, the values of the power good signal Vin_OK and the power fail signal Vin_FL are not limited, and may be set according to actual needs. For example, but not limited to, the power fail signal Vin_FL may be a signal with a value difference from the power good signal Vin_OK, and its value of the power fail signal Vin_FL may be a low level signal, such as zero value.

The conversion circuit 2 includes a rectifying circuit 22. The rectifying circuit 22 receives the input voltage Vin and rectifies the input voltage Vin into a rectified voltage Vb, and a voltage value of the rectified voltage Vb corresponds to the input voltage Vin. In one embodiment, the rectifying circuit 22 is, for example but not limited to, a bridge rectifying circuit. The input detection circuit 14 is coupled to the rectifying circuit 22. When the conversion circuit 2 includes the rectifying circuit 22, the input detection circuit 14 receives the input voltage Vin or the rectified voltage Vb, and correspondingly provides the power good signal Vin_OK or the power fail signal Vin_FL according to whether the input voltage Vin or the rectified voltage Vb is normal or not. The predetermined threshold value Tp may be set and adjusted according to the received input voltage Vin or the received rectified voltage Vb. In one embodiment, the conversion circuit 2 is, for example but not limited to, a bridgeless conversion circuit, such as a bridgeless power factor correction (PFC) circuit. Since the bridgeless conversion circuit does not need to install the rectifying circuit 22 (that is, the rectifying circuit 22 may be omitted), the input detection circuit 14 may only use the input voltage Vin and correspondingly provide the power good signal Vin_OK or the power fail signal Vin_FL.

The detection circuit 3 detects the output voltage Vo according to the feedback condition Cf (such as the first condition) corresponding to the power good signal Vin_OK to generate an output feedback signal Sfb with a first feedback value. Alternatively, the detection circuit 3 detects the output voltage Vo according to the feedback condition Cf (such as the second condition) corresponding to the power fail signal Vin_FL to generate an output feedback signal Sfb with a second feedback value. The controller 4 is coupled to the detection circuit 3 and the conversion circuit 2, and provides a control signal Sc (such as a PWM signal) according to the output feedback signal Sfb to control the conversion circuit 2 so that the conversion circuit 2 controls and stabilizes (regulates) a voltage level of the output voltage Vo.

Specifically, the controller 4 controls the conversion circuit 2 to stabilize the voltage level of the output voltage Vo to a first voltage level according to the output feedback signal Sfb with the first feedback value, and controls the conversion circuit 2 to stabilize the voltage level of the output voltage Vo to a second voltage level according to the output feedback signal Sfb with the second feedback value. Since the output feedback signal Sfb with the second feedback value represents that the input voltage Vin is unstable, and even the input voltage Vin is interrupted, when the controller 4 receives the output feedback signal Sfb with the second feedback value, the voltage level of the output voltage Vo must be maintained at the second voltage level above the second voltage level for a short period of time so as to notify the load 200 that the impending power failure of the input-stage converter will occur, thereby complying with the regulations of the hold-up time of the power supply 100.

For example, take the resistance ratio as the feedback condition Cf as an example. When the detection circuit 3 receives the power good signal Vin_OK, the detection circuit 3 adjusts the resistance ratio to 1:4 (i.e., the first condition), and generates the output feedback signal Sfb with the first feedback value according to the output voltage Vo and the resistance ratio. The controller 4 provides the control signal Sc to control the conversion circuit 2 according to the output feedback signal Sfb with the first feedback value to maintain (stabilize) the voltage level of the output voltage Vo at the first voltage level, for example but not limited to 12 volts.

When the detection circuit 3 receives the power fail signal Vin_FL, the detection circuit 3 adjusts the resistance ratio to 1:4.5 (i.e., the second condition), and generates the output feedback signal Sfb with the second feedback value according to the output voltage Vo and the resistance ratio. The controller 4 provides the control signal Sc to control the conversion circuit 2 according to the output feedback signal Sfb with the second feedback value to maintain (stabilize) the voltage level of the output voltage Vo at the second voltage level, for example but not limited to 10 volts. Since the input voltage Vin is unstable or even interrupted, when the controller 4 receives the output feedback signal Sfb with the second feedback value, the voltage level of the output voltage Vo must be maintained at the second voltage level above the second voltage level for a short period of time so as to notify the load 200 that the impending power failure of the input-stage converter will occur, thereby complying with the regulations of the hold-up time of the power supply 100.

In one embodiment, since the rear-stage circuit (such as the load 200) usually has a specific range of the input voltage that it can accept, for example but not limited to, 9 to 14 volts, as long as the voltage is in this range, the load 200 can operate normally. The design of the second voltage level of the present disclosure is usually set at a lower limit of the input voltage acceptable to the rear-stage circuit so that the load 200 can still operate, and there is sufficient time to prepare before the power off (power failure). In addition, since the rear-stage circuit usually has a detection circuit with an input terminal to detect whether the input voltage is normal or not, the conversion between the first voltage level and the second voltage level is not necessary to add a detection circuit or a communication circuit for the rear-stage circuit (i.e., the load 200). It is only necessary to set the received voltage to be converted from the first voltage level to the second voltage level by the internal controller of the rear-stage circuit to perform the preparatory procedure before the power off (power failure).

Please refer to FIG. 1 again, the conversion circuit 2 may be an isolation switching conversion circuit, for example but not limited to, a conversion circuit with an isolation transformer such as a forward conversion circuit or a flyback conversion circuit. Since this type of conversion circuit 2 usually has an electrically isolated primary side and secondary side, and the large power voltage converted by the conversion circuit 2 usually needs to be electrically isolated from the small power signal output by the detection or control component to avoid the small signal of the control terminal from being affected. Therefore, the present disclosure uses an electrical isolation module 5 to electrically isolate the primary side, the secondary side, and small power signals. Specifically, the electrical isolation module 5 incudes a first isolation unit 52 and a second isolation unit 54, and the first isolation unit 52 and the second isolation unit 54 may be, for example but not limited to, components with electrical isolation functions such as photo couplers and transformers.

The first isolation unit 52 is coupled to the detection circuit 3 and the controller 4, and the second isolation unit 54 is coupled to the input detection circuit 14 and the detection circuit 3. The first isolation unit 52 is mainly used for electrical isolation of small power signals, and is used to convert the output feedback signal Sfb into an electrically isolated first isolation signal Si1 to the controller 4. The controller 4 controls the conversion circuit to stabilize the voltage level of the output voltage Vo according to the first isolation signal Si1. The second isolation unit 54 is mainly used to electrically isolate the primary side and the secondary side, and is used to convert the power good signal Vin_OK or the power fail signal Vin_FL into an electrically isolated second isolation signal Si2 to the detection circuit 3. The detection circuit 3 adjusts the feedback condition Cf according to the second isolation signal Si2.

In the conventional power supply 100 with an input voltage status pin 100A (indicated by the dashed line), the connection port 100-1 is usually used to process (such as electrical isolation) the power good signal Vin_OK or the power fail signal Vin_FL, and then provides an input voltage status signal (such as a PWOK signal) to the rear-stage circuit, and therefore the connection port 100-1 must have one more pin, which is usually called POWER_GOOD. The power supply 100 usually converts an AC mains (i.e., the input voltage Vin) into a DC output voltage Vo of 12 volts, and then converts the 12-volt voltage into, for example but not limited to, 5 volts, 3.3 volts, and 1.8 volts. Therefore, the POWER_GOOD pin must be pulled out several circuit board traces to connect to each rear-stage circuit and the central processing unit of the circuit board. In the occasion of high-density wiring of the circuit board, adding several additional wiring will inevitably cause wiring difficulties, especially the signal wiring of small power must avoid the power path of large power, and avoid the power path of large power. The signal is coupled to the low-power signal, causing signal distortion, which will inevitably greatly increase the difficulty of signal routing and the routing density of the circuit board.

The main purpose and effect of the present disclosure is to couple the detection circuit 3 through the input detection circuit 14 so as to change the feedback condition Cf of the detection circuit 3 by the power good signal Vin_OK or the power fail signal Vin_FL to change the voltage level of the output voltage Vo. The change of the output voltage Vo notifies the current operation status of the power supply 100 and the advance notice of the impending power failure. Since the second voltage level of the output voltage Vo of the present disclosure replaces the input voltage status signal (i.e., the PWOK signal) provided by the original input voltage status pin 100A (i.e., the POWER_GOOD pin), the controller 4 can change the output voltage Vo of the conversion circuit 2 from the first voltage level to the second voltage level to notify the rear-stage circuit (i.e., the load 200) that the power supply of the conversion circuit 2 is abnormal to notice the power outage in advance. Therefore, several circuit board wiring can be omitted, and the difficulty of circuit board wiring and the wiring density of the circuit board can be reduced.

Figure 2:
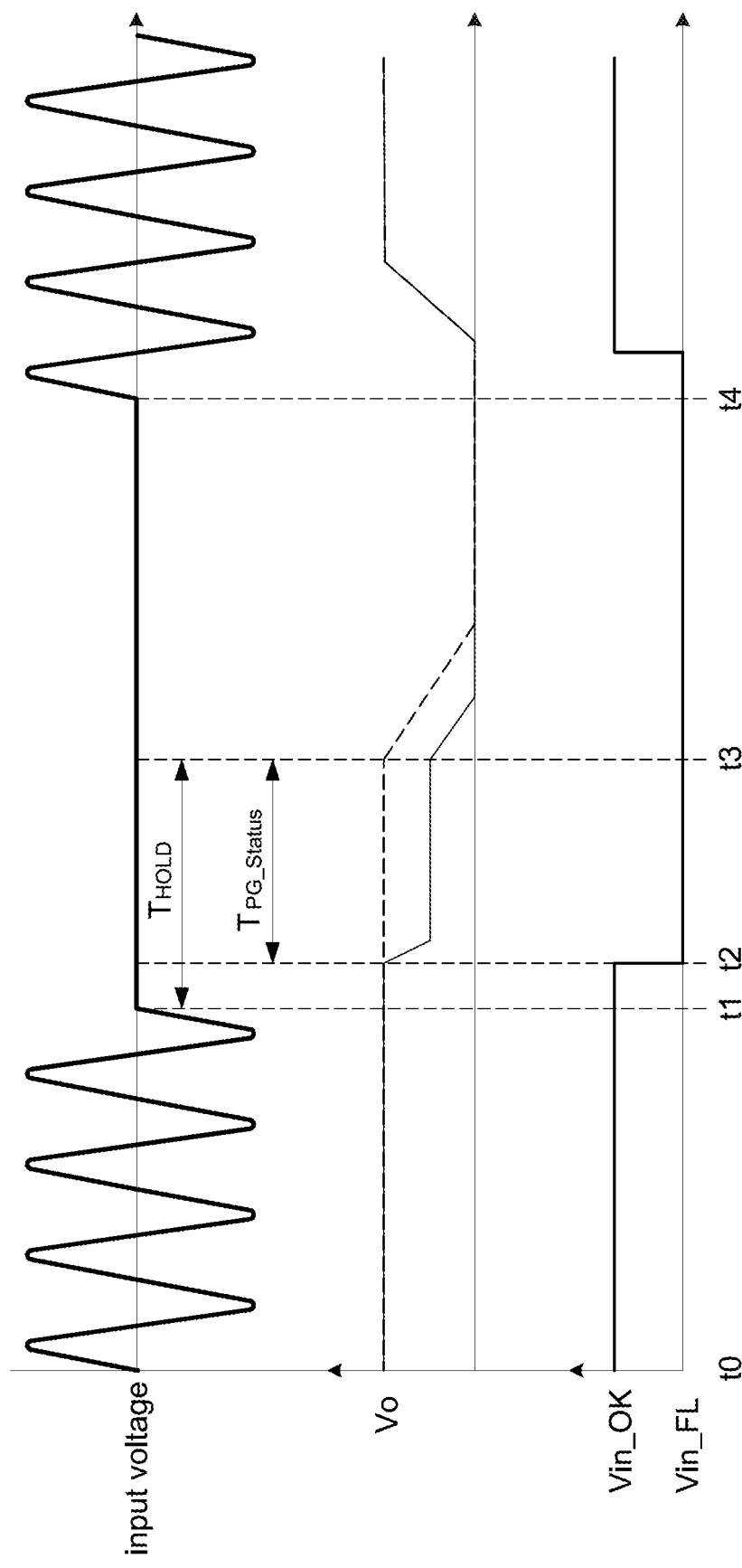
FIG. 2 is a timing waveform diagram of the power supply according to the present disclosure.

Please refer to FIG. 2, which shows a timing waveform diagram of the power supply according to the present disclosure, and also refer to FIG. 1. When the input voltage Vin is normal (at time t0), the input detection circuit 14 provides the power good signal Vin_OK to the detection circuit 3, and the controller 4 controls the voltage level of the output voltage Vo to be the first voltage level (for example, 12 volts) according to the output feedback signal Sfb with the first feedback value. The input voltage Vin is powered off at time t1, and the input detection circuit 14 delays for a short period of time (usually a time difference of several microseconds to several milliseconds), and converts the power good signal Vin_OK to the power fail signal Vin_FL at time 2. At this condition, the detection circuit 3 changes the feedback condition Cf so that the controller 4 controls the voltage level of the output voltage Vo to the second voltage level (for example, 10 volts) according to the output feedback signal Sfb with the second feedback value.

Since the input voltage Vin is powered off at time t1, the controller 4 must maintain the output voltage Vo to be higher than the second voltage level during the time t1 to time t3 to comply with the regulations of the power supply 100. The time t1 to time t3 is the hold-up time set by the power supply 100. After time t3, since the remaining energy of the power supply 100 cannot maintain the voltage level of the output voltage Vo, the voltage level of the output voltage Vo gradually decreases. At time t4, the input voltage Vin is restored. Therefore, the input detection circuit 14 again provides the power good signal Vin_OK to the detection circuit 3, and the controller 4 controls the voltage level of the output voltage Vo to gradually rise to the first voltage level (for example, 12 volts).

Figure 3:
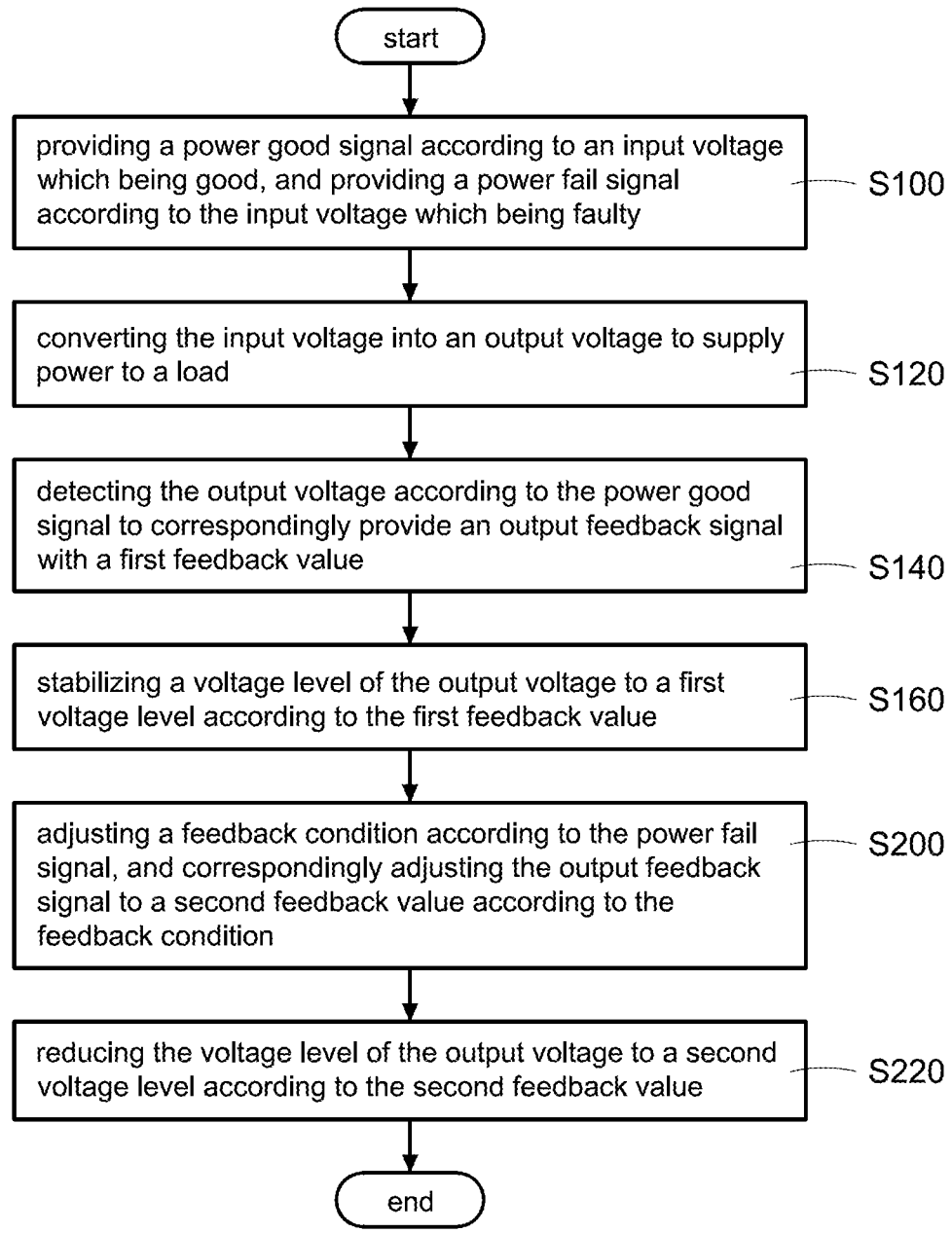
FIG. 3 is a flowchart of a method of operating the power supply without the input voltage status pin according to the present disclosure.

Please refer to FIG. 3, which shows a flowchart of a method of operating the power supply without the input voltage status pin according to the present disclosure, and also refer to FIG. 1 to FIG. 2. The power supply 100 converts the input voltage Vim into the output voltage Vo to supply power to the load 200. The method of operating the power supply 100 includes steps of: first, providing a power good signal according to the input voltage which being good, and providing a power fail signal according to the input voltage which being faulty (S100). In one embodiment, the input detection circuit 14 correspondingly provides the power good signal Vin_OK or the power fail signal Vin_FL according to whether the input voltage Vin is normal or not. When the conversion circuit 2 includes the rectifying circuit 22, the input detection circuit 14 receives the input voltage Vin or the rectified voltage Vb, and correspondingly provides the power good signal Vin_OK or the power fail signal Vin_FL according to whether the input voltage Vin or the rectified voltage Vb is normal or not. Afterward, converting the input voltage into an output voltage to supply power to the load (S120). In one embodiment, the conversion circuit 2 converts the input voltage Vin into the output voltage Vo to supply power to the load 200.

Afterward, detecting the output voltage according to the power good signal to correspondingly provide an output feedback signal with a first feedback value (S140). In one embodiment, the detection circuit 3 adjusts the feedback condition Cf to a first condition according to the power good signal Vin_OK, and detects the output voltage Vo to correspondingly generate the output feedback signal Sfb with the first feedback value. Afterward, stabilizing a voltage level of the output voltage to a first voltage level according to the first feedback value (S160). In one embodiment, the controller 4 controls the conversion circuit 2 to stabilize the voltage level of the output voltage Vo to a first voltage level according to the output feedback signal Sfb with the first feedback value to continuously supply the power required for the operation of the load 200.

Afterward, adjusting a feedback condition according to the power fail signal, and correspondingly adjusting the output feedback signal to a second feedback value according to the feedback condition (S200). In one embodiment, the detection circuit 3 adjusts the feedback condition Cf to a second condition according to the power fail signal Vin_FL, and detects the output voltage Vo to correspondingly generate the output feedback signal Sfb with the second feedback value. Finally, reducing the voltage level of the output voltage to a second voltage level according to the second feedback value (S220). In one embodiment, the controller 4 controls the conversion circuit 2 to stabilize the voltage level of the output voltage Vo to the second voltage level according to the output feedback signal Sfb with the second feedback value so as to notify the load 200 that the power of supplying the power supply 100 is abnormal and the impending power failure will occur. The above-mentioned signal transmission may be achieved by an electrical isolation module 5 as shown in FIG. 1 to implement the effect of electrical isolation. For detailed steps, please refer to the related content of FIG. 1, and the detail description is omitted here for conciseness.

For example, take the resistance ratio as the feedback condition Cf as an example. The input detection circuit 14 sets a predetermined threshold value Tp and determines whether the input voltage Vin (or the rectified voltage Vb corresponding to the input voltage Vin) is greater than the predetermined threshold value Tp. When the input detection circuit 14 determines that the input voltage Vin (or the rectified voltage Vb) is greater than the predetermined threshold value Tp, it means that the input voltage Vin is stable and normal. At this condition, the input detection circuit 14 provides the power good signal Vin_OK representing that that the input voltage Vin is good. When the input detection circuit 14 determines that the input voltage Vin (or the rectified voltage Vb) is less than the predetermined threshold value Tp, it means that the input voltage Vin is unstable, or even the input voltage Vin is interrupted. At this condition, the input detection circuit 14 provides the power fail signal Vin_FL representing that the input voltage Vin is faulty (not good). Finally, when the detection circuit 3 receives the power good signal Vin_OK, the detection circuit 3 adjusts the resistance ratio to 1:4 (i.e., the first condition), and generates the output feedback signal Sfb with the first feedback value according to the output voltage Vo and the resistance ratio. When the detection circuit 3 receives the power fail signal Vin_FL, the detection circuit 3 adjusts the resistance ratio to 1:4.5 (i.e., the second condition), and generates the output feedback signal Sfb with the second feedback value according to the output voltage Vo and the resistance ratio.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power supply without an input voltage status pin, configured to convert an input voltage to supply power to a load, the power supply comprising:
   an input detection circuit, configured to provide a power good signal according to the input voltage which being good, and provide a power fail signal according to the input voltage which being faulty,
   a conversion circuit, configured to convert the input voltage into an output voltage to supply power to the load,
   an output detection circuit, coupled to an output end of the conversion circuit and the input detection circuit, and configured to detect the output voltage according to the power good signal to correspondingly provide an output feedback signal with a first feedback value, and
   a controller, coupled to the output detection circuit and the conversion circuit, and configured to control the conversion circuit to stabilize a voltage level of the output voltage to a first voltage level according to the first feedback value,
   wherein the output detection circuit is configured to self-adjust a feedback condition according to the power fail signal to correspondingly adjust the output feedback signal to a second feedback value according to the feedback condition; the controller is configured to control the conversion circuit to reduce the voltage level of the output voltage to a second voltage level according to the second feedback value.

2. The power supply as claimed in claim 1, wherein the second voltage value represents an input voltage status signal; the controller notifies the load that the power of supplying the conversion circuit is abnormal by changing the output voltage of the conversion circuit from the first voltage level to the second voltage level.

3. The power supply as claimed in claim 1, wherein the conversion circuit is an isolation switching conversion circuit, and further comprising:
an electrical isolation module, coupled to the input detection circuit, the output detection circuit, and the controller,
wherein the electrical isolation module is used to transmit the output feedback signal, the power good signal, and the power fail signal in an electrical isolation manner.

4. The power supply as claimed in claim 3, wherein the electrical isolation module comprises:
a first isolation unit, coupled to the output detection circuit and the controller, and
a second isolation unit, coupled to the input detection circuit and the output detection circuit,
wherein the first isolation unit is configured to convert the output feedback signal into an electrically isolated first isolation signal to the controller, and the controller controls the conversion circuit to stabilize the voltage level of the output voltage according to the first isolation signal; the second isolation unit is configured to convert the power good signal or the power fail signal into an electrically isolated second isolation signal to the output detection circuit, and the output detection circuit adjusts the feedback condition according to the second isolation signal.

5. The power supply as claimed in claim 1, wherein the conversion circuit comprises:
a rectifying circuit, configured to rectify the input voltage into a rectified voltage,
wherein the input detection circuit is configured to receive the input voltage or the rectified voltage; the input detection circuit provides the power good signal when the input voltage or the rectified voltage is greater than a predetermined threshold value, or the input detection circuit provides the power fail signal when the input voltage or the rectified voltage is less than the predetermined threshold value.

6. The power supply as claimed in claim 1, wherein the feedback condition is a resistance ratio; the output detection circuit correspondingly adjusts the resistance ratio according to the received power good signal or the received power fail signal.

7. A method of operating a power supply without an input voltage status pin, the power supply configured to convert an input voltage to supply power to a load, the method comprising steps of:

providing a power good signal according to the input voltage which being good, and providing a power fail signal according to the input voltage which being faulty,
converting the input voltage into an output voltage to supply power to the load,
detecting the output voltage according to the power good signal to correspondingly provide an output feedback signal with a first feedback value,
stabilizing a voltage level of the output voltage to a first voltage level according to the first feedback value,
adjusting a feedback condition according to the power fail signal, and correspondingly adjusting the output feedback signal to a second feedback value according to the feedback condition, and
reducing the voltage level of the output voltage to a second voltage level according to the second feedback value.

8. The method as claimed in claim 7, further comprising a step of:
changing the first voltage level of the output voltage to the second voltage level to notify the load that the power of supplying the power supply is abnormal.

9. The method as claimed in claim 7, further comprising steps of:
converting the output feedback signal to an electrically isolated first isolation signal and stabilizing the voltage level of the output voltage according to the first isolation signal, and
converting the power good signal or the power fail signal to an electrically isolated second isolation signal and adjusting the feedback condition according to the second isolation signal.

10. The method as claimed in claim 7, wherein the feedback condition is a resistance ratio; the method further comprising steps of:
determining whether the input voltage is greater than a predetermined threshold value,
providing the power good signal when the input voltage is greater than the predetermined threshold value,
providing the power fail signal when the input voltage is less than the predetermined threshold value, and
correspondingly adjusting the resistance ratio according to the received power good signal or the received power fail signal.

* * * * *